Feb. 5, 1924.
B. HASKELL
BRAKE HEAD
Filed May 2, 1922
1,482,609
2 Sheets-Sheet 1
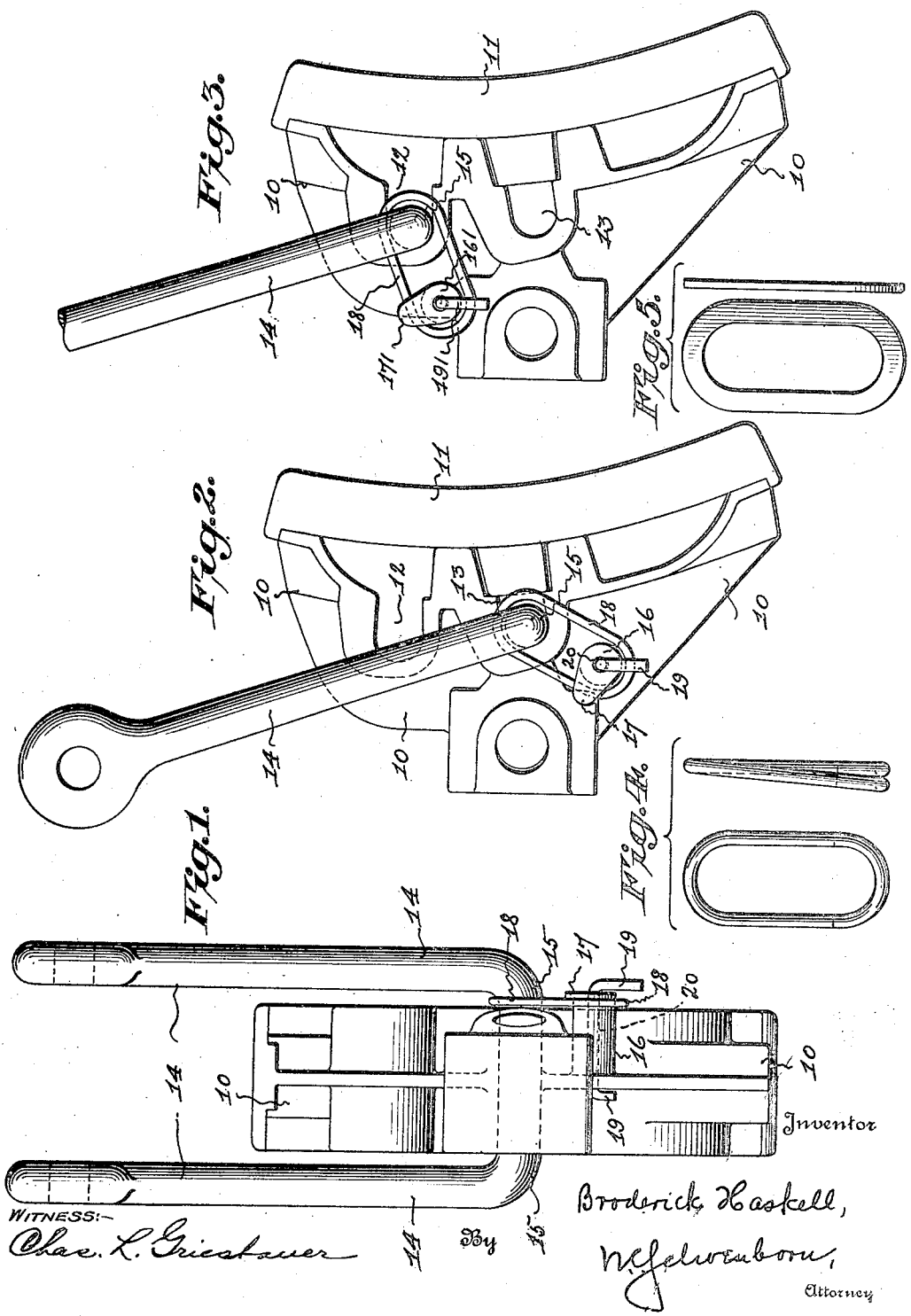

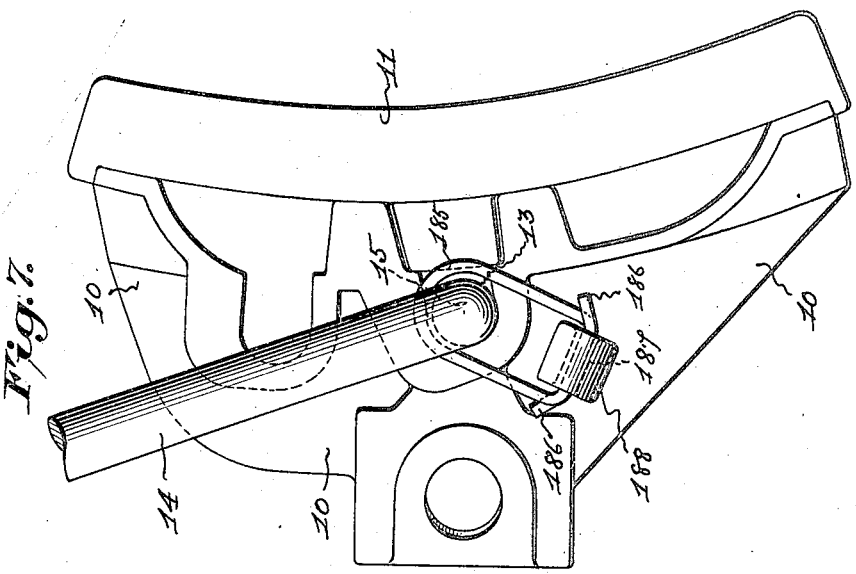
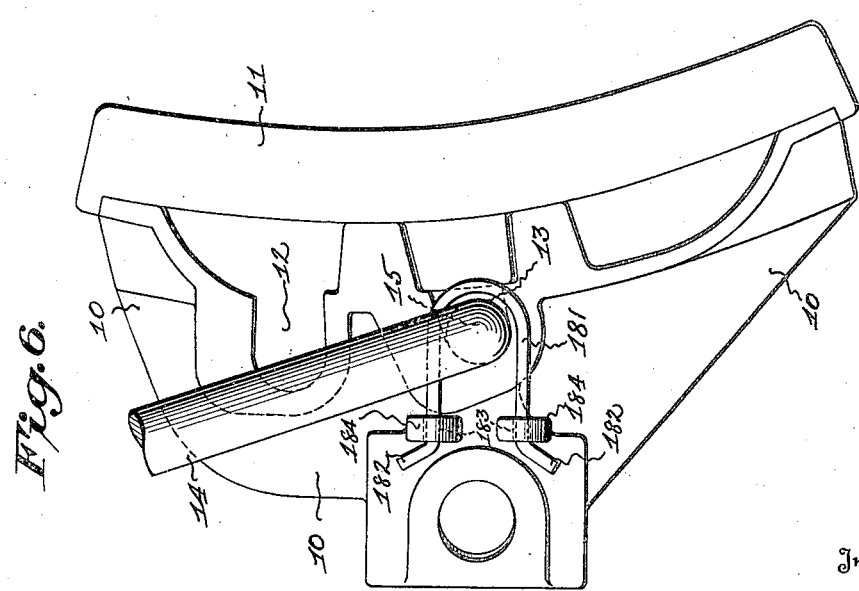

Patented Feb. 5, 1924.

1,482,609

UNITED STATES PATENT OFFICE.

BRODERICK HASKELL, OF FRANKLIN, PENNSYLVANIA.

BRAKE HEAD.

Application filed May 2, 1922. Serial No. 557,881.

*To all whom it may concern:*

Be it known that I, BRODERICK HASKELL, a citizen of the United States, residing at Franklin, in the county of Venango and State of Pennsylvania, have invented certain new and useful Improvements in Brake Heads, of which the following is a specification.

This invention relates to brake heads, and more especially to means for locking the brake hanger in the brake head which will act as a safety holder and prevent the brake head from becoming disconnected from the hanger, although the brake shoe and its key may become detached and lost.

The objects of the invention are:

First, to construct and arrange a safety holder as above indicated which is simple in construction and consists of a minimum number of parts adapted to be easily and cheaply manufactured and incorporated in the standard type of brake head and be most effective in securing said brake head and hanger together without in any way preventing them in fully and efficiently carrying out their required functions.

Second, to provide a safety holder which can be easily applied or removed from the brake head, and will not fail to perform its function continuously and properly support the brake head and prevent the brake beam falling on the track should the brake shoe and its key become detached from the brake head.

Other objects and advantages of the invention will appear from the construction and manner of assembling and applying the same to be presently described more in detail.

The invention consists of structural characteristics and relative arrangements of elements which will be hereinafter more fully described and particularly pointed out in the appended claims.

Referring to the drawings in which similar reference characters indicate the same parts in the several figures of the drawings:

Figure 1 is rear elevational view of the brake head with the invention applied.

Figure 2 is a side elevational view of the improved brake head.

Figure 3 is a side elevational view of a modified form of the invention.

Figures 4 and 5 represent front and side views of two forms of links which may be used in connection with the invention shown in Figures 1 to 3, and Figures 6 and 7 are side elevational views of other modified forms of the improved brake head.

Referring to Figures 1 and 2, 10 represents the brake head, and 11 the brake shoe which is securely seated and fastened to said brake head 10 by the well known key, not shown, in the usual manner, and forms no part of the present invention.

The brake head 10 is provided with the usual upper and lower transverse hanger receiving recesses 12 and 13, and 14 represents an ordinary form of brake hanger which is at its upper end pivotally connected to the car truck, and is of U-shape, the lower connecting member 15 of which constitutes a journal which is seated or loosely journaled in the recess 12, as shown in Figure 2.

In order to lock or securely hold the hanger 14 and head 10 together independent of any other means such as the brake shoe 11, or its key, not shown, I provide on one side of the central web of the head 10 a lug 16 preferably circular in cross-section and provided with an extension or lip 17, preferably arranged at an angle as shown.

18 is a retaining member or link which is slipped over an upper end of the hanger 14 and interposed between a side of the brake head 10 and adjacent arm of the hanger 14 and is so adjusted as to surround the lower connecting member 15 at one end while the other end of said link 18 is hooked over the extension or lip 17 and around the circular lug 16, as shown in Figure 2.

To further secure said link 18 in engagement with the lug 16 and in proper relation with the lip or extension 17 there is provided a locking pin 19 which passes loosely through a hole 20 preferably in the longitudinal axis of the lug 16, the ends of said pin 19 being bent over at right angles for the purpose of preventing the pin from dropping out from the lug 16 and at same time have its outer bent end, by the action of gravity, at all times project over the edge of the lug 16 and lug-engaging end of the link 18, as shown in Figure 2, and avoid said link from becoming displaced off said lug as will be readily understood.

In the form of the invention shown in Figure 3, the construction and arrangement of parts are substantially the same as illustrated in Figures 1 and 2, except that the hanger 14 is journaled in the upper recess 12 and the lug 161 with its lip 171 and locking pin 191 cooperating with the retaining member or link 18 are shifted and arranged adjacent to said upper recess 12.

While I have shown in Figures 1, 2 and 3 a link 18 which is round in construction and closed, said link may be broken or rectangular in section as shown for example in Figures 4 and 5, if so desired.

In the form of the invention shown in Figure 6, the retaining member interposed between the hanger 14 and head 10 is a U-shaped piece of heavy wire 181, the closed or connecting end of which surrounds the lower member 15 of the hanger 14 while its free ends 182 are bent over and outwardly, as shown, after having been passed through suitable openings 183 in properly disposed and spaced lugs 184, 184, thereby securely holding said retaining member 181 in proper position, as shown, with respect to said head 10 and member 181 under all conditions of service.

Figure 7 shows the retaining member 185 of the same general construction and arrangement as shown and described with reference to Figure 6, except that its free ends 186 are bent inwardly and towards each other and passed through an opening 187 in a lug 188 formed in the central web of the head 10 and performs its function and operates in substantially the same manner as the different forms of the invention previously described with reference to Figures 1 to 6.

From the foregoing disclosure of the construction and arrangement of the improvement and manner of applying the same, it will be seen that all the objects and advantages recited in the statement of invention have been fully and efficiently carried out, and while I have shown and described my preferred forms or modifications, it will be apparent that many changes will readily suggest themselves without in any way departing from the salient features herein disclosed and embodied in the scope of the claims.

What I claim is:—

1. The combination with a brake head provided with a transverse hanger receiving recess, a hanger having its lower section insertible in said recess, a retaining member surrounding said hanger and interposed between said hanger and a side of said brake head and connected to the outer side of said brake head.

2. The combination with a brake head provided with a transverse hanger receiving recess, a U-shaped hanger having its lower connecting member insertible in said recess, a retaining member for said hanger interposed between said hanger and a side of said brake head and surrounding said hanger and connected to the outer side of said brake head.

3. The combination with a brake head provided with a transverse hanger receiving recess, a lug on one side of said brake head, a U-shaped hanger having its lower connecting member insertible in said recess, a retaining member for said hanger interposed between said hanger and a side of said brake head and surrounding said hanger and removably connected to the lug on said brake head.

4. The combination with a brake head provided with a transverse hanger receiving recess, a hanger having its lower connecting member insertible in said recess and its side arms separated from and adjacent to the side walls of the brake head, a retaining member for said hanger interposed between a side arm of said hanger and a side wall of the brake head and surrounding said hanger and connected to the outer side of said brake head.

5. The combination with a brake head provided with a transverse hanger receiving recess, a lug having a lip and fixed on said brake head, a U-shaped hanger having its lower connecting member insertible in said recess, a retaining member for said hanger interposed between said hanger and a side of said brake head and removably connected by said lip to the lug on said brake head.

6. The combination with a brake head provided with a transverse hanger receiving recess, a lug having a locking pin and fixed on said brake head, a hanger having its lower connecting member insertible in said recess and its side arms separated from and adjacent to the side walls of the brake head, a retaining member for and surrounding said hanger and interposed between a side arm of said hanger and a side wall of the brake head and detachably connected by said pin to said lug and brake head.

7. The combination with a brake head provided with a transverse hanger receiving recess, a lug on said brake head, a locking pin attached to said lug, a U-shaped hanger having its lower connecting member insertible in said recess and its side arms separated from and adjacent to the side walls of the brake head, a retaining member for and surrounding said hanger and interposed between a side arm of said hanger and a side wall of the brake head and surround said lug for connecting said retaining member to said brake head.

8. The combination with a brake head provided with a transverse hanger receiving recess, a hanger having its lower connecting member insertible in said recess and its side arms separated from and adjacent to the side walls of the brake head, a retaining member for and surrounding said hanger and interposed between a side arm of said hanger and a side wall of the brake head and connected to said brake head.

9. The combination with a brake head provided with a transverse hanger receiving recess, a hanger having its lower connecting member insertible in said recess and its side arms separated from and adjacent to the side walls of the brake head, a retaining member for said hanger surrounding the lower connecting member and interposed between a side arm of said hanger and a side wall of the brake head and connected to said brake head.

10. The combination with a brake head provided with a transverse hanger receiving recess, a lug on said brake head, a U-shaped hanger having its lower connecting member insertible in said recess and its side arms separated from and adjacent to the side walls of the brake head, a retaining member for and surrounding said hanger and interposed between a side arm of said hanger and a side wall of the brake head and means on said lug for connecting said retaining member to said brake head.

11. The combination with a brake head provided with a transverse hanger receiving recess, a U-shaped hanger having its lower connecting member insertible in said recess and its side arms separated from and adjacent to the side walls of the brake head, a retaining member for and surrounding said hanger and interposed between a side arm of said hanger and a side wall of the brake head and means on said brake head for detachably connecting said retaining member to said brake head.

In testimony whereof I affix my signature.

BRODERICK HASKELL.